(12) United States Patent
Jalali et al.

(10) Patent No.: US 10,846,714 B2
(45) Date of Patent: *Nov. 24, 2020

(54) ADAPTIVE FUZZY FALLBACK STRATIFIED SAMPLING FOR FAST REPORTING AND FORECASTING

(71) Applicant: Amobee, Inc., Redwood City, CA (US)

(72) Inventors: Ali Jalali, San Mateo, CA (US);
Santanu Kolay, San Jose, CA (US);
Peter Foldes, San Francisco, CA (US);
Ali Dasdan, San Jose, CA (US)

(73) Assignee: Amobee, Inc., Redwood City, CA (US)

( * ) Notice: Subject to any disclaimer, the term of this patent is extended or adjusted under 35 U.S.C. 154(b) by 1045 days.

This patent is subject to a terminal disclaimer.

(21) Appl. No.: 15/352,496

(22) Filed: Nov. 15, 2016

(65) Prior Publication Data
US 2017/0068972 A1  Mar. 9, 2017

Related U.S. Application Data

(63) Continuation of application No. 14/043,889, filed on Oct. 2, 2013, now Pat. No. 9,524,510.

(51) Int. Cl.
   *G06Q 30/02* (2012.01)
   *G06N 3/04* (2006.01)
   *G06N 7/02* (2006.01)

(52) U.S. Cl.
   CPC ....... *G06Q 30/0202* (2013.01); *G06N 3/0436* (2013.01); *G06N 7/02* (2013.01); *G06Q 30/0242* (2013.01); *G06Q 30/0277* (2013.01)

(58) Field of Classification Search
   CPC .......... G06Q 30/0202; G06Q 30/0242; G06Q 30/0277; G06N 3/0436; G06N 7/02
   See application file for complete search history.

(56) References Cited

U.S. PATENT DOCUMENTS 4,290,300 A    9/1981  Carver
5,680,530 A   10/1997  Selfridge et al.
(Continued)

OTHER PUBLICATIONS

Auda et al, "Voting Schemes for Cooperative Neural Network Classifiers", IEEE Explore Aug. 2002, all pages (Year: 2002).*
(Continued)

*Primary Examiner* — Daniel C Puentes
(74) *Attorney, Agent, or Firm* — Kwan & Olynick LLP

(57) ABSTRACT

Techniques and mechanisms described herein facilitate adaptive fuzzy fallback stratified sampling. According to various embodiments, an actual or estimated minimum vertex cover of a feature dependency graph representing a dataset may be determined. The dataset may include a plurality of feature vectors and a plurality of features. Each feature vector may include a plurality of feature values that correspond with the features. The feature dependency graph may represent a plurality of conditional dependencies between the features. The minimum vertex cover may designate a subset of the features for strata selection. The feature vectors may be partitioned into a plurality of strata based on the designated subset of features. Each stratum may include one or more of the feature vectors. Each feature vector may be assigned to a corresponding stratum based on the values of the designated subset of features for the feature vector.

20 Claims, 7 Drawing Sheets

(56) References Cited

U.S. PATENT DOCUMENTS

| | | | |
|---|---|---|---|
| 6,012,094 A | 1/2000 | Leymann et al. | |
| 6,049,797 A | 4/2000 | Guha et al. | |
| 6,092,072 A | 7/2000 | Guha et al. | |
| 6,636,853 B1 | 10/2003 | Stephens, Jr. | |
| 6,704,454 B1 | 3/2004 | Spence et al. | |
| 8,781,978 B2 | 7/2014 | Milenova et al. | |
| 2002/0065857 A1 | 5/2002 | Michalewicz et al. | |
| 2002/0116309 A1 | 8/2002 | Keyes et al. | |
| 2004/0139067 A1 | 7/2004 | Houle | |
| 2006/0224579 A1* | 10/2006 | Zheng | G06F 16/951 |
| 2007/0074108 A1 | 3/2007 | Xie et al. | |
| 2007/0087756 A1 | 4/2007 | Hoffberg | |
| 2007/0219990 A1 | 9/2007 | Crivat et al. | |
| 2008/0120257 A1 | 5/2008 | Goyal et al. | |
| 2008/0147441 A1 | 6/2008 | Kil | |
| 2008/0256018 A1 | 10/2008 | Chaudhury et al. | |
| 2009/0287721 A1 | 1/2009 | Golab et al. | |
| 2009/0037323 A1 | 2/2009 | Feinstein et al. | |
| 2009/0047677 A1 | 2/2009 | Frasch et al. | |
| 2009/0157572 A1 | 6/2009 | Chidlovskii | |
| 2010/0161605 A1 | 6/2010 | Gabrilovich et al. | |
| 2010/0332430 A1 | 12/2010 | Caraviello et al. | |
| 2011/0229025 A1 | 9/2011 | Zhao et al. | |
| 2011/0251875 A1 | 10/2011 | Cosman | |
| 2011/0304332 A1 | 12/2011 | Mahfouz | |
| 2012/0090834 A1 | 4/2012 | Imhof et al. | |
| 2012/0131031 A1 | 5/2012 | Xie et al. | |
| 2013/0039548 A1 | 2/2013 | Nielsen et al. | |
| 2013/0197814 A1 | 8/2013 | McBratney et al. | |
| 2013/0263181 A1 | 10/2013 | Impollonia et al. | |
| 2013/0325786 A1 | 12/2013 | Min et al. | |
| 2014/0279762 A1 | 9/2014 | Xaypanya et al. | |
| 2014/0280952 A1 | 9/2014 | Shear et al. | |
| 2014/0282586 A1 | 9/2014 | Shear et al. | |
| 2015/0095136 A1 | 4/2015 | Jalali et al. | |

OTHER PUBLICATIONS

Auda et al, "Voting Schemes for Neural Network Classifiers", Aug. 2002, IEEE Explore, all pages (Year: 2002).*

"U.S. Appl. No. 14/043,889, Examiner Interview Summary dated Aug. 8, 2016", 3 pages.

"U.S. Appl. No. 14/043,889, Non Final Office Action dated Apr. 28, 2016", 15 pages.

"U.S. Appl. No. 14/043,889, Notice of Allowance dated Aug. 12, 2016", 11 pages.

Bresler, Guy et al., "Reconstruction of Markov Random Fields from Samples: Some Observations and Algorithms", Approx and Random 2008, LNCS 5171 pp. 343-356 2008, 14 pages.

Chen, Yih , "Grid Service Monitor: Performance Monitoring and Measurement of Grid Services Using Peer-to-Peer Techniques", Master's Thesis, University of Edinburgh, 2005, 81 pages.

Podgurski, Andy et al., "Estimation of Software Reliability by Stratified Sampling", ACM Transactions on Software Engineering and Methodology, vol. 8 No. 3 pp. 263-283 Jul. 1999, 21 pages.

Shafique, Khurram H. , "Partitioning a Graph in Alliances and Its Application to Data Clustering", Ph. D Dissertation University of Central Florida, Fall Term 2004, 154 pages.

* cited by examiner ical field

ADAPTIVE FUZZY FALLBACK STRATIFIED SAMPLING FOR FAST REPORTING AND FORECASTING

CROSS-REFERENCE TO RELATED APPLICATIONS

This application is a continuation of and claims benefit under 35 U.S.C. § 120 to U.S. application Ser. No. 14/043,889, filed 2 Oct. 2013 by Ali Jalali et al., which is herein incorporated by reference for all purposes.

TECHNICAL FIELD

The present disclosure relates generally to data analysis and more specifically to the analysis of datasets for providing market forecasts for online advertising campaigns.

DESCRIPTION OF RELATED ART

In online advertising, internet users are presented with advertisements as they browse the internet using a web browser. Online advertising is an efficient way for advertisers to convey advertising information to potential purchasers of goods and services. It is also an efficient tool for non-profit/political organizations to increase the awareness in a target group of people. The presentation of an advertisement to a single internet user is referred to as an ad impression.

Advertisers are often concerned about the efficiency of their online advertising campaigns. Many advertisers therefore would like to restrict their ad impressions to certain websites, content categories and audiences, and/or other classifications. These restrictions, known as targeting criteria, limit the reachability of an advertising campaign in exchange for potentially better performance.

Formulating accurate predictions regarding the performance of decisions affecting this tradeoff typically involves processing extremely large amounts of data. Nevertheless, decisions affecting this tradeoff between reachability and performance must be made accurately and quickly, often in real time.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for adaptive fuzzy fallback stratified sampling for fast reporting and forecasting. According to various embodiments, an actual or estimated minimum vertex cover of a feature dependency graph representing a dataset. The dataset may include a plurality of feature vectors and a plurality of features. Each feature vector may include a plurality of feature values that correspond with the features. Each feature may be capable of assuming two or more values. The feature dependency graph may represent a plurality of conditional dependencies between the features. The minimum vertex cover may designate a subset of the features for strata selection.

In some embodiments, the feature vectors may be partitioned into a plurality of strata based on the designated subset of features. Each stratum may include one or more of the feature vectors. Each feature vector may be assigned to a corresponding stratum based on the values of the designated subset of features for the feature vector.

According to various embodiments, a stratified sample that includes a plurality of sample observations may be selected from the dataset. Each stratum may have a corresponding size, and the observations may be selected from the stratums in proportion to the stratum size. The stratified sample may be distributed among a plurality of computing nodes in a computing system where each node stores a respective portion of the sample. A query request may be transmitted to each of the plurality of computing nodes. Responses received from the plurality of computing nodes that each describes a result of the query request for respective portion of the stratified sample stored on the computing node may be aggregated.

In some embodiments, one or more strata may be designated as being unstable based on the size of a requested stratified sample to be selected from the dataset and a size of the strata. For instance, an unstable stratum may have a respective stratum size that is too small for the stratum to be represented in the requested sample.

In some embodiments, a respective fallback position for each or selected ones of the strata designated as unstable. A stratum may be designated as unstable when the stratum size is less than or equal to the size of the dataset divided by twice the sample size. Each fallback position may group the feature vectors within the unstable stratum with feature vectors within a different stratum.

In some embodiments, a fallback position may be determined by merging the unstable stratum with a stable stratum that includes feature vectors that most closely match the unstable stratum. The selected stratum may have the smallest stratum size of the stable strata that include feature vectors that most closely match the unstable stratum.

In some embodiments, a fallback position may be determined by distributing the feature vectors associated with the unstable stratum among one or more intersecting strata that are associated with feature values that overlap those of the unstable stratum. The feature vectors associated with the unstable stratum may be distributed among the intersecting strata in proportion to the degree to which the unstable stratum intersects each intersecting stratum.

In some embodiments, the feature dependency graph may be determined at least in part by determining a Markov Random Field. Alternately, or additionally, the feature dependency graph may be determined by identifying a plurality of correlations between the features of the dataset that each characterizes a dependency relationship between two of the features.

These and other features of the present invention will be presented in more detail in the following specification of certain embodiments of the invention and the accompanying figures which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
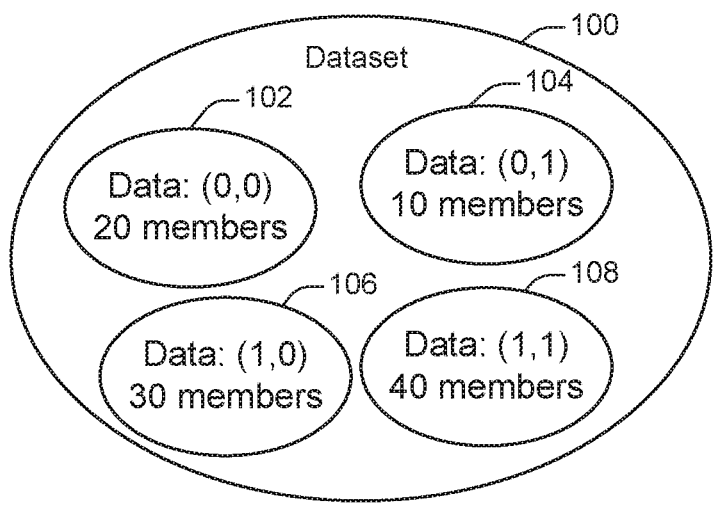
FIG. 1 illustrates an arrangement of data, organized in accordance with one or more embodiments.
Figure 1:
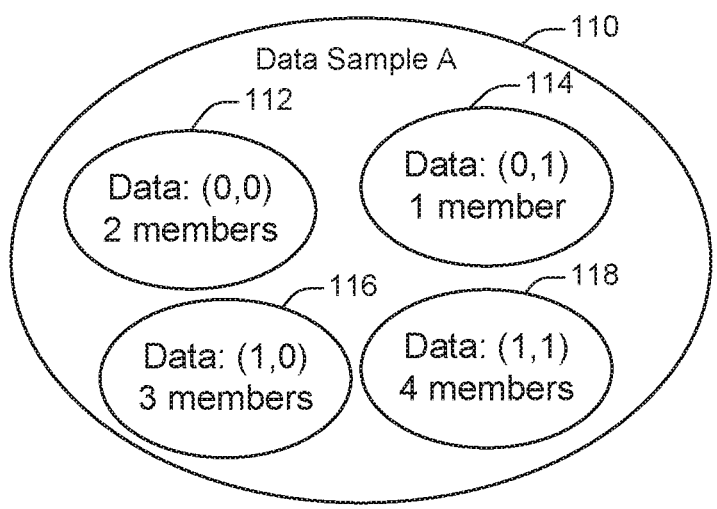
Figure 1:
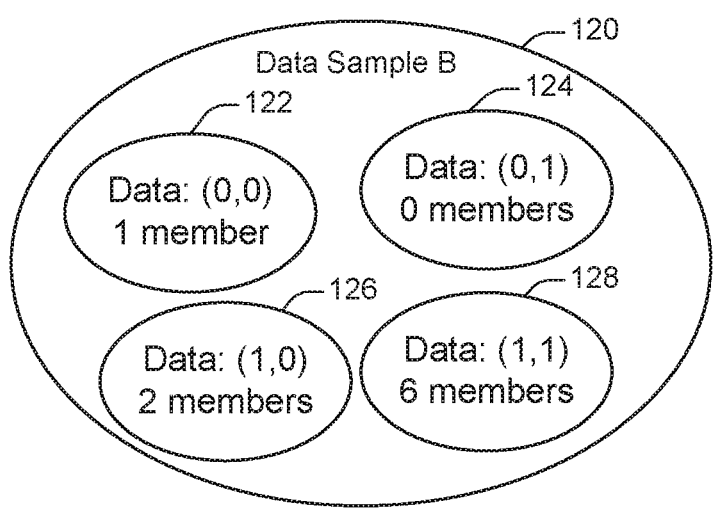

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data analysis techniques and mechanisms. However, it should be noted that the techniques and mechanisms of the present invention apply to a variety of different data analysis techniques and mechanisms. In the following description, numerous specific details are set forth in order to provide a thorough understanding of the present invention. Particular example embodiments of the present invention may be implemented without some or all of these specific details. In other instances, well known process operations have not been described in detail so as not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein facilitate the configuration and operation of a fault tolerant online advertising analysis system that can quickly and accurately make decisions affecting the tradeoff between reachability and performance in online advertising campaigns. According to various embodiments, the online advertising analysis system may use previously collected data to forecast the results of potential decisions in an online advertising campaign. In order to facilitate more rapid analysis, a representative sample of the data may be stored in memory across multiple machines. Then, the forecasting problem may be formulated as queries against the sample. Strata of the data may be selected using multivariate statistical stratified sampling techniques. The sampling techniques may include a fuzzy fallback approach to cover relatively small minorities within the data.

Example Embodiments

Forecasting is the problem of using past data to predict events whose actual outcomes have not yet been observed. In general, generating a fast and accurate report of the past data is challenging when the analyzed dataset is large. For instance, advertisers would like to frequently forecast on thousands of dimensions to thoroughly understand a market and spend their budgets wisely. Further, advertisers typically expect to receive a forecasting result in a few seconds so that they can adjust their audience and/or contextual targeting. However, such queries often require a long time and a large amount of computing resources when run against very large datasets.

One way of generating fast and accurate reports is to take a relatively small sample from the original large dataset and run queries against that sample. At the end, the result can be scaled up to compensate for the sampling rate. In such a scheme, the accuracy of the report depends on how well the sample represents the larger dataset. Since a dataset can lie in a high dimensional space, with potentially thousands of dimensions, selecting a representative sample of the data can be quite challenging. For instance, uniform sampling performs poorly and is highly unlikely to yield a representative sample, despite its popular use in the advertising industry.

Described herein are techniques that facilitate robust and accurate sampling procedures as well as a distributed system architecture that uses the samples to generate query results. According to various embodiments, the problem of generating fast and accurate reports may be treated as a sampling problem. Various metrics described herein may be applied to measure the quality of the report produced by sampling techniques. Sampling techniques and mechanisms described herein may be used to select a sample accurately and may be practically applied to even very large datasets. Further, techniques and mechanisms described herein may be used to divide a data sample among different machines in a distributed system in such a way that the query procedure is robust to partial system failure. That is, the sampling procedure can produce reasonable results even if some portion of a distributed system fails and/or some portion of the sample is unavailable during the query procedure.

According to various embodiments, systems configured in accordance with techniques and mechanisms described herein may facilitate near real-time responses, often within a few seconds. Systems configured in accordance with techniques and mechanisms described herein may also support progressive result updating. In progressive result updating, results are updated in near real-time as the scanning of the sample progresses in parallel on multiple machines. In this way, users may be able to get a very quick estimate of the results of a query before the full query computation finishes.

According to various embodiments, systems configured in accordance with techniques and mechanisms described herein may be fault tolerant. That is, in the presence of network or hardware failures, the system may still produce results. Systems configured in accordance with techniques and mechanisms described herein may also be scalable. The system may exhibit horizontal scalability in the sense that adding additional servers allows the system to execute on the sample faster and/or execute on larger samples for higher accuracy. Alternately, or additionally, the system may exhibit query handling scalability in the sense that the system can handle an increased number of query requests without significant performance or accuracy degradation.

According to various embodiments, a stratified sampling procedure may be used. The procedure may identify a set of strata in a high-dimensional data space from which a sample is to be selected. A fuzzy fallback operation may be used to map minor strata to related major strata to ensure the diversity and accuracy of the sample. Distributed stratified sampling may be implemented based on the identified strata and the fuzzy fallback operation. The resulting samples may be distributed across multiple machines to provide fast report generation on a fault tolerant system.

According to various embodiments, techniques and mechanisms described herein may be used to forecast the results of advertising campaigns. This forecasting may allow advertisers to specify their targeting constraints and budget spend so as to reach the best segments of the audients with the best valuation. Further, the forecasting may be performed quickly, allowing advertisers to perform interactive exploration while finalizing their campaign parameters during campaign setup. Forecasting may also be used to evaluate the demand-side platform (DSP) partner of an advertiser to compare the actual returns of a campaign with the forecasted performance. Similarly, a DSP may use forecasting to debug campaign delivery and performance issues.

FIG. 1 illustrates an arrangement of data, organized in accordance with one or more embodiments. FIG. 1 is a simplified example showing a small, low-dimensional dataset along with samples drawn from that dataset for the purpose of illustration. FIG. 1 includes a dataset 100, an accurate data sample A 110, and an inaccurate data sample B 120.

A dataset may be composed of a number of rows and columns. Each row of the dataset may correspond to a different feature vector, which may also be referred to as an observation. For instance, each row in a dataset used for advertising purposes may correspond to an individual person.

Each column of the dataset may correspond to a variable or category that describes a type of property or quality that each observation of the dataset may exhibit. For instance, one column of a dataset may indicate whether a person is male or female. As another example, a different column of a dataset may indicate a person's age or birthday.

According to various embodiments, when a variable is continuous or has a high number of possible values, such as a birthday column, the variable may be bucketized. For instance, all persons born during a particular year may be assigned the same categorical variable for birth year even though more detailed data may be available.

In the dataset 100 shown in FIG. 1, each observation is associated with two variables, each of which can take a value of "0" or "1". Thus, each observation may be represented as one of four possible data value combinations: (0,0), (0,1), (1,0), (1,1). The possible combinations of the values that the feature vector can take are referred to as strata. Thus, the dataset 100 shown in FIG. 1 has four strata.

In practice, datasets may be high-dimensional, including potentially hundreds of thousands or even millions of different variables for each observation. Further, in practice, each variable may often be assigned any of potentially many different values, so the feature vectors in many datasets include many different strata. However, a more limited dataset is shown in FIG. 1 for the purpose of illustration.

The dataset 100 includes 100 different observations, and each grouping within the dataset 100 represents a subset of these observations. For instance, the subset 102 includes the 20 observations that have data values (0,0). The subset 104 includes the 10 observations that have data values (0,1). The subset 106 includes the 30 observations that have data values (1,0). The subset 108 includes the 40 observations that have data values (1,1).

Analyzing a dataset often involves executing queries that perform operations such as counting the number of features that lie in a certain subspace of the dataset. For instance, one query may count the number of observations in which the first variable has a value of "0". However, as the dataset increases in the number of rows and the number of variables, both the storage space and the time required to store and query the entire dataset can become prohibitively high. Accordingly, a sample of the dataset may be selected. Then, a query may be run on the sample and scaled up to estimate the result of the query if it were to be run on the entire dataset.

For instance, in FIG. 1, a sample of size 10 may be selected from the dataset of size 100. Then, when a counting query is run on the sample, the resulting count may be multiplied by 10 to estimate the number of observations within the dataset as a whole.

In practice, datasets and samples are typically much larger than those shown in FIG. 1. For instance, samples that include millions of observations may potentially be selected from datasets that include billions of observations.

If the data sample selected is accurate, the size of the strata in the sample will be proportional to the size of the strata in the dataset. For instance, in the accurate data sample A 110, the stratum (0,0) 112 has 2 members, the stratum (0,1) 114 has 1 member, the stratum (1,0) 116 has 3 members, and the stratum (1,1) 118 has 4 members. These strata sizes are each 1/10 the size of the strata in the dataset 100, so the sample is accurate.

If the data sample selected is inaccurate, the size of the strata in the sample will be disproportional to the size of the strata in the dataset. For instance, in the inaccurate data sample B 120, the stratum (0,0) 122 has 1 member, the stratum (0,1) 124 has 0 members, the stratum (1,0) 126 has 2 members, and the stratum (1,1) 128 has 6 members. The sample is inaccurate because these strata sizes are not proportional to the size of the strata in the dataset 100.

Various sampling procedures for selecting a sample from a larger dataset have been proposed. However, many pre-existing sample procedures do not adapt well to high-dimensional datasets in which the data has, for example, 250,000 different dimensions. Also, many preexisting sample procedures do not adapt well to datasets composed primarily or entirely of categorical variables.

A naïve way to calculate a sample of a dataset is to use uniform sampling to select a sample. For instance, to select a sample of size 10 from a dataset of size 100, 10 observations of the dataset would be selected at random without replacement. In this way, each observation in the dataset would have a uniform probability of being selected for inclusion in the sample. However, uniform sampling often results in the selection of a sample that poorly represents the original dataset. For example, the inaccurate data sample B 120 may be generated by selecting 10 observations at random from the dataset 100 shown in FIG. 1.

Some approaches to Adaptive Query Processing (AQP) may address the problem as a GROUP-BY query approximation using a smaller sample by employing a mixture of uniform and biased sampling techniques. However, these approaches generally do not scale well to tables with very large numbers of columns. Further, these approaches often ignore cases where the sample produced by the sampling procedure does not adequately support highly selective queries. Since many constraints, such as geographic constraints, commonly requested by advertisers yield highly selected queries, these approaches would often lead to a less than satisfactory user experience in the advertising space.

Other approaches to AQP may use stratified sampling to approximate query processing under a workload distribution. For instance, a set of fundamental strata may be chosen based on an expected query load with the constraint that whenever a fundamental stratum is used, all elements from that stratum must be selected. However, these approaches are inapplicable when estimating the expected query load is difficult or impossible, which is often the case when analyzing advertising data. Further, these approaches may also fail to scale well to high-dimensional datasets.

Still other approaches to AQP may focus on maintaining dynamic, self-tuning samples that produce smaller errors for more frequent query types. Over time, successive queries yield a sample that contains the subset of rows from the original dataset with each selected row having a weight proportional to the number of queries that the row answers. However, these approaches do not provide a way to limit the overall sample size, which is important when the available space across all strata is limited. Further, in advertising applications, a requirement may include accurately and quickly generating responses to queries, even when the queries are unforeseen.

Some techniques may involve constructing multidimensional histograms to answer queries approximately over very high dimensional data cubes. For instance, data may be processed offline and used to build a multidimensional histogram to use as a pre-aggregate during later queries. However, these techniques are focused on online analytical processing (OLAP) queries and are not well suited to processing arbitrary queries. Further, these techniques are often computationally complex and cannot support rapid runtime when generating a large sample (e.g., millions of rows) from an even larger dataset (e.g., billions of rows).

Figure 2:
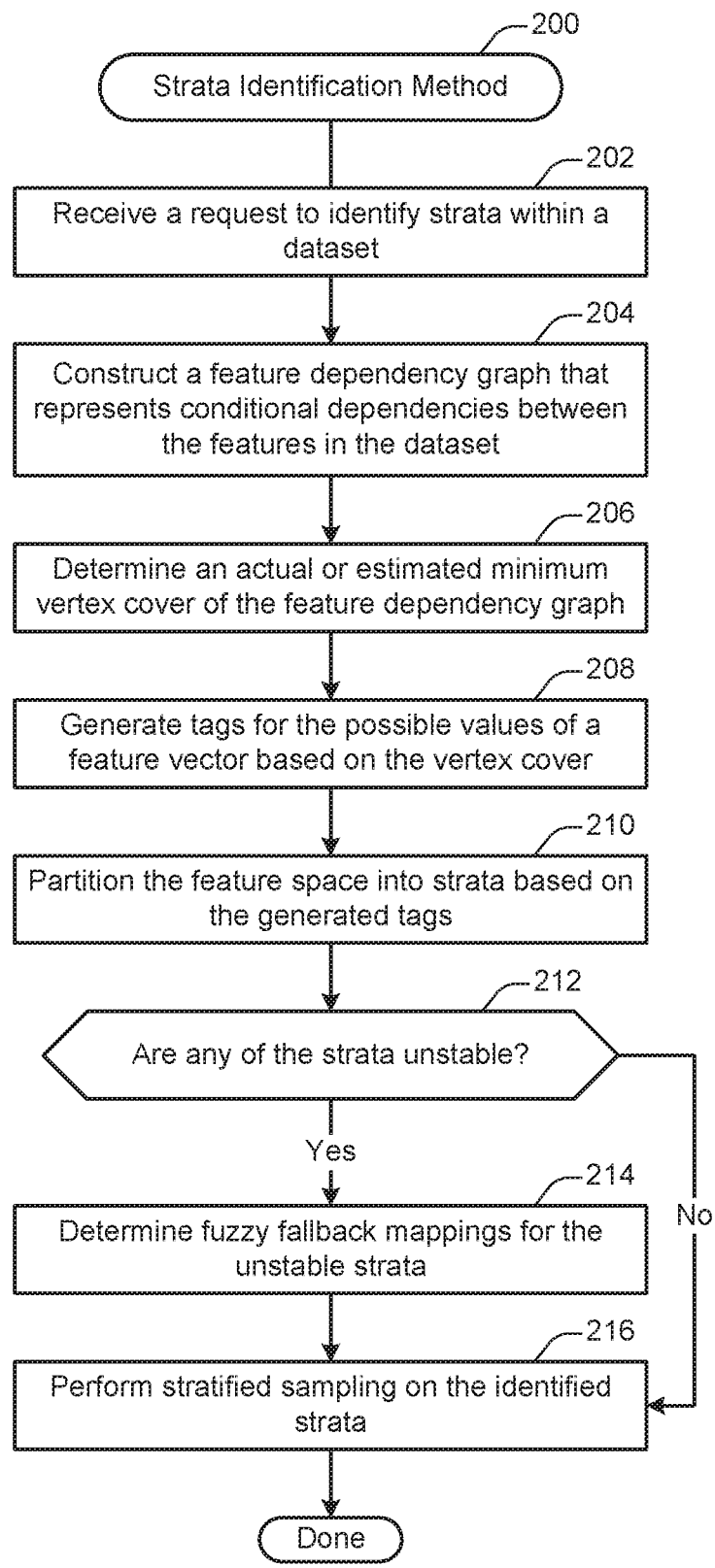
FIG. 2 illustrates an example of a strata identification method, performed in accordance with one or more embodiments.

FIG. 2 illustrates an example of a strata identification method 200, performed in accordance with one or more embodiments. Subsets of similar feature vectors, referred to herein as strata, may be identified in order to select a better sample from a dataset. In a high dimensional dataset, the data must be partitioned into strata such that each stratum is not too big to include non-similar feature vectors and not too small to require a large sample size. The method 200 may be used to identify strata of appropriate size for use in selecting representative samples from the dataset.

In many high dimensional datasets, not all of the features are independent. For instance, a subset of features (i.e. dimensions) may be identified such that every other feature in the dataset is highly correlated with the feature subset. Then, strata may be identified by reducing the dimension of the feature vectors to the dimension of the identified subset. The observations that make up the dataset may then be divided into the identified strata in order to represent the population as a whole.

At 202, a request to identify strata within a dataset is received. According to various embodiments, the request to identify strata may be received prior to performing stratified sampling of the dataset. For instance, a new dataset may be received for sampling or an existing dataset may be updated. The identification of strata and the stratified sampling may be performed periodically so that the sample used by the system to execute queries accurately reflects the overall dataset.

At 204, a feature dependency graph that represents conditional dependencies between the features in the dataset is constructed. According to various embodiments, the feature dependency graph may characterize the degree of correlation between different features. Two features that are highly correlated are linked in the feature dependency graph, while features that are uncorrelated are not linked in the feature dependency graph.

In particular embodiments, the feature dependency graph may be a Markov Random Field (MRF). An MRF is a set of vertices having a Markov property described by an undirected graph. A set of vertices has the Markov property if the conditional distribution of each vertex depends only upon the state of the vertices connected with it, and not on other unconnected vertices.

For example, each feature in the dataset may be treated as a node in a graph. Then, MRF assigns a matrix to the edge intersecting features $x_j$ and $x_k$:

$$\theta_{j,k} \in \mathbb{R}^{m_j \times m_k}$$

The matrix is selected such that:

$$\mathbb{P}[x_j = t \mid x_1, \ldots, x_{j-1}, x_{j+1}, \ldots, x_K] \propto \exp\left(-\sum_{k \neq j} \sum_{q=1}^{m_k} \theta_{j,k}(t, q) 1_{\{x_k = q\}}\right)$$

In the above equations, $\theta_{j,k}(t, q)$ is the (t,q) element of the matrix $\theta_{j,k}$, and $1_{\{\cdot\}}$ is the indicator function. If we remove the edges with matrix $\theta_{j,k}(t, q)$ equal to zero, the remaining graph has the property that each feature conditioned on its neighbors in the graph is independent from the rest of the graph. This is a generalization of the Markov Chain where each event given the immediate previous event is independent from the history of events. Various algorithms exist for constructing an MRF graph from a dataset.

At 206, an actual or estimated minimum vertex cover of the feature dependency graph is determined. A vertex cover of a graph is a set of vertices such that each edge of the graph is incident to at least one vertex of the set. A minimum vertex cover is a vertex cover of smallest possible size. Conceptually, a minimum subset of vertices is found such that if they are removed, the rest of the graph becomes completely disconnected. Then, according to the feature dependency graph constructed in operation 204, those vertices are independent of each other given the vertices in our subset. In general, determining a minimum vertex cover is a computationally complex problem that is NP-hard. A problem is NP-hard if it is requires at least non-deterministic polynomial time in order to solve the problem completely and in the general case. However, various approximations may be used to reduce the computational complexity while producing a suitably accurate estimation.

According to various embodiments, the result of the minimum vertex cover is a set of features that are, in some sense, salient within the feature set. Conceptually, each feature vector in the feature set can be classified by the value of its features that fall within the set of features selected in the minimum vertex cover.

At 208, tags are generated for the possible values of a feature vector based on the vertex cover. As discussed herein, a tag v is of the form "$x_i=m$" for the $i^{th}$ feature taking value m. The vertex cover calculated in operation 206 yields a set of vertexes where each vertex corresponds to a salient feature of the feature vectors. For each of these feature, a key-value tag (e.g., "$x_1=1$") is generated for each value that the feature can take. Thus, if K* features are selected in operation 206 and feature j may take on m different values, the number of different tags totals: $\Pi_{j-1}^{K*} m_j$.

After these tags are generated, each feature vector in the dataset can be tagged with the set of tags relevant to the feature vector. For each feature vector, tagging may be limited to only the K* features selected in operation 206. For instance, each feature vector may be assigned a set of tags $\{"x_1=a_1", \ldots, "x_K*=a_K*"\}$.

At 210, the feature space is partitioned into strata based on the generated tags. Conceptually, each tag can be viewed as a set. Viewed in this way, each feature vector lies in the intersection of the sets corresponding to its tags. This view represents a partitioning of the feature space. Each of those partitions may be selected as a stratum.

In particular embodiments, by tagging and partitioning the data in this way, a feature vector may be reasonably classified even if some tags are missing. For instance, if a feature vector is missing one or more tags, the feature vector can be moved to the intersection of the strata that include the portions of the feature vector that are present, and the missing portion of the feature vector can be ignored.

At 212, a determination is made as to whether any of the strata are unstable. According to various embodiments, each stratum may be designated as stable or unstable. Consider the strata identified in operation 210 in the form of intersection of sets. Let $T_v$ be the set of all feature vectors that are tagged with the tag v. A tag v is of the form "$x_i=m$" for the $i^{th}$ feature taking value m. Considering strata as the partitions defined by all possible intersections of sets $T_v$, some of these strata include enough feature vectors that they can potentially have at least one representative in the stratified sample. However, with many datasets and sample sizes commonly used, many strata will not have enough feature vectors to have at least one representative in the stratified sample. A stratum that has a sufficient number of feature vectors may be designated as stable, while a stratum that does not have a sufficient number of feature vectors may be designated as unstable.

According to various embodiments, a stratum may be designated as unstable when it includes too few observations to have at least one representative in the stratified sample. Accordingly, determining whether each stratum is unstable may involve identifying a number of observations in each stratum and comparing that number to a designated stability threshold. For instance, if a sample of size n is to be collected from a dataset that includes N observations, a stratum may be designated as unstable if it does not include more than N/(2n) observations. For example, in FIG. 1, suppose that a sample of size 5 were selected from the dataset 100. In this case, any stratum that did not include more than 100/(2*5)=10 feature vectors (e.g., the stratum 104) may be designated as unstable.

At 214, fuzzy fallback mappings are determined for the unstable strata. In some embodiments, fuzzy fallback mappings may be used to map unstable strata into stable strata so that the chance of having strata with small population decreases. By mapping the unstable strata into stable strata, more of the population in the dataset will have an opportunity to be represented in the stratified sample. In particular, the fuzzy fallback mappings may provide better representation opportunities for relatively small strata that represent minority populations that do not make up a large portion of the dataset.

According to various embodiments, different techniques may be used to determine fuzzy fallback mappings. Examples of two such sets of techniques are described with respect to FIGS. 3 and 4. When determining fuzzy fallback mappings, various tradeoffs may be made. For instance, the procedure illustrated in FIG. 3 has lower computational complexity than the procedure illustrated in FIG. 4 but may be slightly more inaccurate. In contrast, the procedure illustrated in FIG. 4 may provide better stratification results at the expense of some computational cost.

At 216, stratified sampling is performed on the identified strata. According to various embodiments, sampling may be performed by selecting feature vectors from the dataset to include in the sample. When stratified sampling is used, the feature vectors are selected from the strata in proportion to the strata size. For instance, in FIG. 1, if a sample of size 10 were to be selected from the dataset 100 of size 100, then the resulting sample would be similar to the data sample A 110 in which the sizes of the strata in the data sample A 110 are proportional to the sizes of the strata in the dataset 100.

According to various embodiments, after the stratified sample is selected, the sample may be made available for running queries. For instance, the stratified sample may be stored in a storage system for distribution to counter nodes in a distributed computing system. Techniques and mechanisms for storing, distributing, and querying a stratified sample are discussed with respect to FIGS. 5-7.

Figure 3:
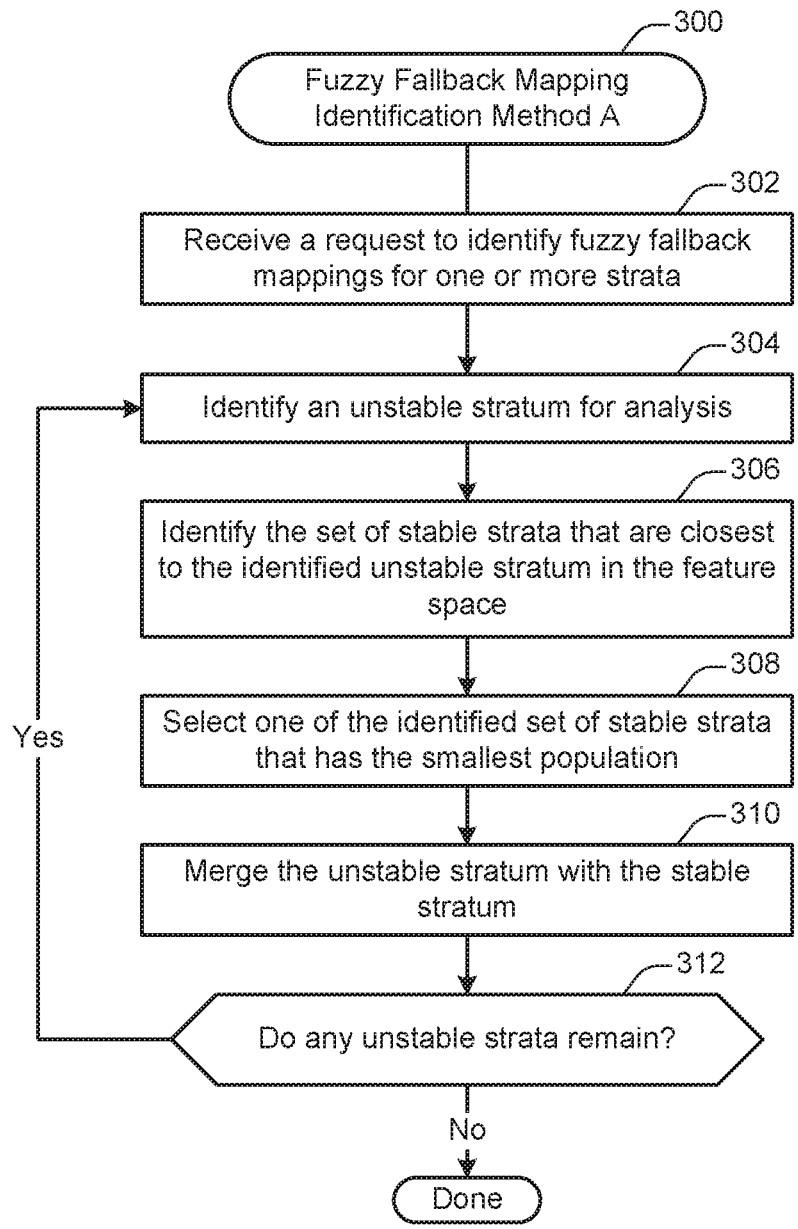
FIG. 3 illustrates an example of a fuzzy fallback identification method A, performed in accordance with one or more embodiments.

FIG. 3 illustrates an example of a fuzzy fallback identification method A 300, performed in accordance with one or more embodiments. According to various embodiments, the method 300 may be used to merge unstable stratum with similar, stable stratum. In this way, the observations in unstable stratum may be represented among the selected sample.

At 302, a request to identify fuzzy fallback mappings for one or more strata is received. According to various embodiments, the request to identify fuzzy fallback mappings may be received in response to a determination that one or more strata identified via a strata identification method are unstable, as discussed with respect to operations 212 and 214 shown in FIG. 2.

At 304, an unstable stratum is identified for analysis. According to various embodiments, the unstable stratum may be any stratum identified as unstable in the strata identification method. As discussed with respect to FIG. 2, a stratum may be designated as unstable if the stratum does not contain more than N/(2n) observations, where N represents the size of the dataset and n represents the size of the sample.

At 306, the set of stable strata that are closest to the identified unstable stratum in the feature space are identified. According to various embodiments, the strata that are closest to the identified unstable stratum may be those that have the greatest number of features in common with the unstable stratum. For instance, each observation may be composed of a large number of features. An unstable stratum may overlap with potentially many different stable strata in the sense that some of the values for feature vectors in the unstable stratum may be shared with some of the values for feature vectors in one or more stable strata. The stable strata for which the feature vectors overlap the most with the unstable stratum are those where the observations have the most in common with the unstable stratum.

At 308, one of the identified set of stable strata that has the smallest population is identified. According to various embodiments, merging the unstable stratum with the closest stable stratum with the smallest population may allow the unstable stratum the best chance at being represented in the sample while causing the least disruption of larger strata that have more observations.

At 310, the unstable stratum is merged with the stable stratum to create a new stratum. Because the merged stratum includes the all of the observations of both strata, one of which was stable, the resulting merged stratum can be designated as stable.

At 312, a determination is made as to whether any unstable strata remain. The procedure may continue to merge strata so long as the set of strata includes at least one unstable stratum.

Figure 4:
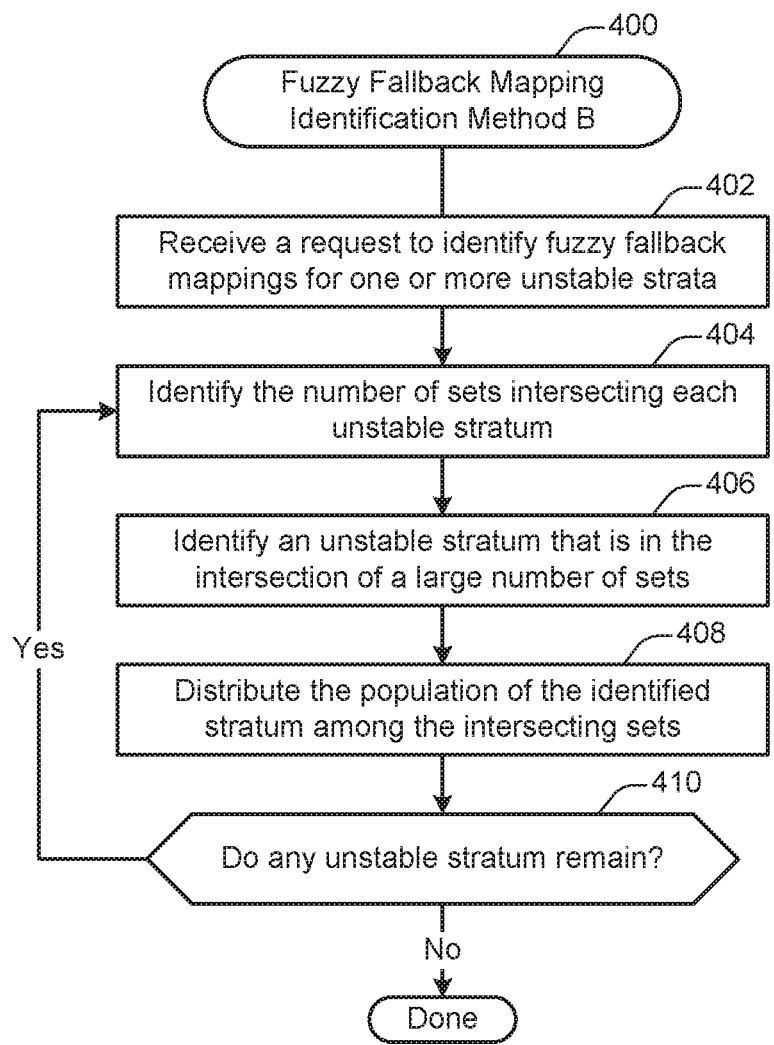
FIG. 4 illustrates an example of a fuzzy fallback identification method B, performed in accordance with one or more embodiments.

FIG. 4 illustrates an example of a fuzzy fallback identification method B 400, performed in accordance with one or more embodiments. According to various embodiments, the method 400 may be performed in order to assign a fuzzy fallback position to unstable stratum based on intersecting, or overlapping stratum.

Each stratum of the dataset may overlap with any number of other strata in the dataset. For instance, in the example shown in FIG. 1, each stratum within the dataset 100 intersects exactly two other strata. The stratum 104 intersects the stratum 102 because in both of these datasets, the first element is zero. Similarly, the stratum 104 intersects the stratum 108 since in both of these datasets, the second element is one.

Observations in strata that overlap are in some sense more similar than observations in strata that do not overlap. Accordingly, overlapping strata may be used to define a fuzzy fallback position for unstable strata. For example, if a data sample of size 5 were to be selected from the dataset 100 shown in FIG. 1, then the stratum 104 would be unstable. However, the population of the stratum 104 may be divided among the overlapping strata 102 and 108 so that the population of the stratum 104 may be represented in the sample.

At 402, a request to identify fuzzy fallback mappings for one or more unstable strata is received. According to various embodiments, the request to identify fuzzy fallback mappings may be received in response to a determination that one or more strata identified via a strata identification method are unstable, as discussed with respect to operations 212 and 214 shown in FIG. 2.

At 404, the number of sets intersecting each unstable stratum is identified. According to various embodiments, the number of intersecting sets, or strata, may be identified by identifying commonalties between the strata using a query. The query may attempt to match each stratum with each other stratum and then count the number of overlapping observations.

The number of sets intersecting each unstable stratum may be maintained and updated with new information as necessary. For instance, in operation 408, the population of an unstable stratum is distributed among the intersecting sets. This distribution may increase the population of one or more previously unstable strata beyond the threshold for instability.

At 406, an unstable stratum that is in the intersection of a large number of sets is identified. According to various embodiments, the unstable stratum may be identified by selecting the stratum from among the strata for which intersection information is identified at operation 404. In particular embodiments, the unstable stratum that is identified may be the stratum that is in the intersection of the maximum number of sets. Alternately, some other selection criterion may be used. For instance, the unstable stratum that has the largest percentage of overlap with intersecting sets may be selected.

At 408, the population of the identified stratum is distributed among the intersecting sets. According to various embodiments, the population of the identified stratum may be distributed among any stable or unstable intersecting stratum. The observations in the identified stratum may be distributed in proportion to the size of the size of the intersections. For instance, if 50% of the observations of an unstable stratum intersect with a first stratum and 25% of the observations intersect with a second stratum, then ⅔ of the observations of the unstable stratum may be allocated to the first intersecting stratum, while the remaining ⅓ of the observations are allocated to the second intersecting stratum.

At 410, a determination is made as to whether any unstable stratum remains. As discussed with respect to operation 404, the procedure may maintain a listing of stratum along with metadata information indicating whether each stratum is stable or unstable. When no unstable stratum remains, the procedure may terminate. In some instances, one or more unstable strata may have no intersecting subset strata. In this case, any of various operations may be performed. For instance, the procedure may terminate without assigning fuzzy fallback positions to these strata.

Figure 5:
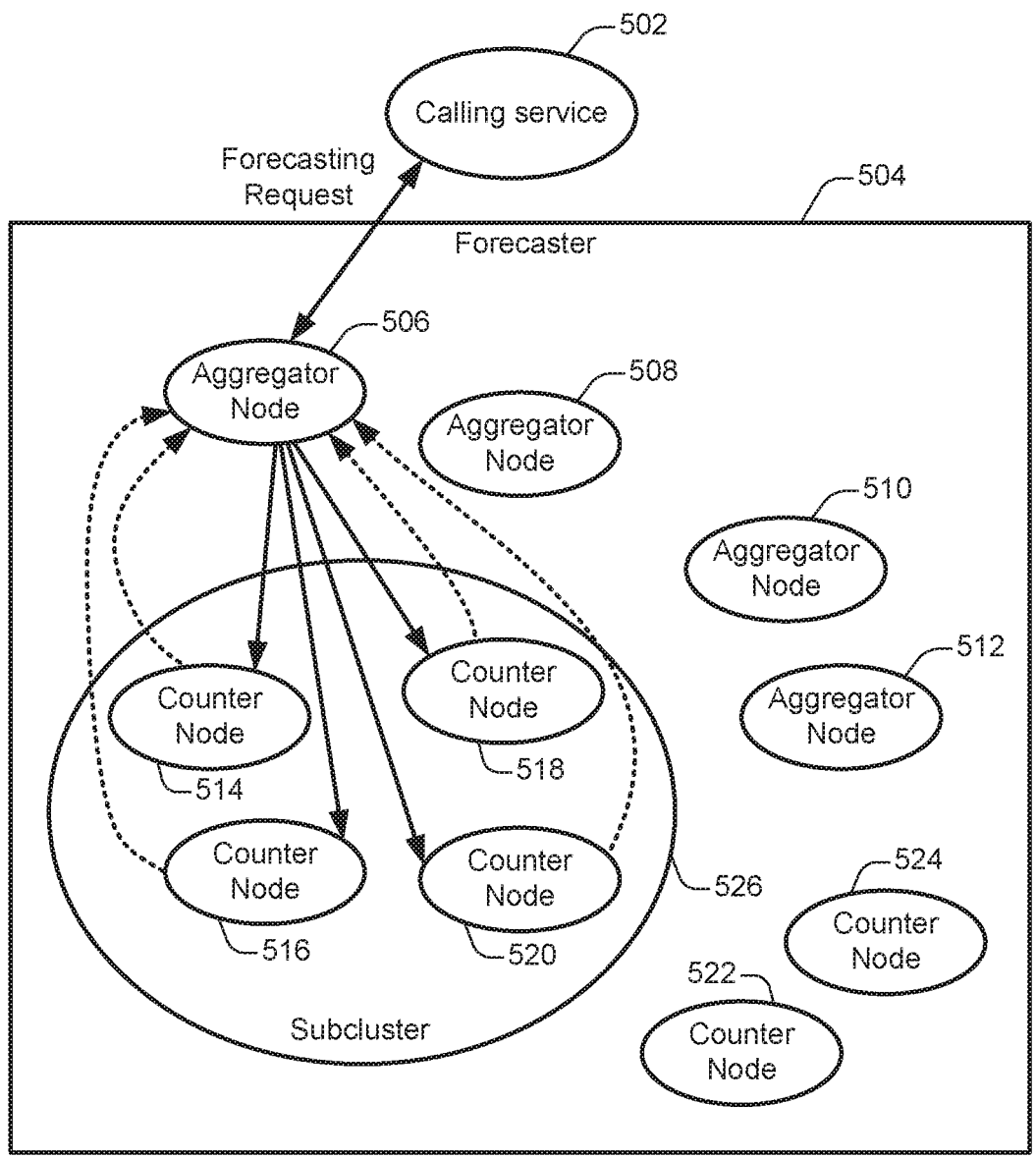
FIG. 5 illustrates an example of a system for executing forecasting queries, configured in accordance with one or more embodiments.

FIG. 5 illustrates an example of a system for executing forecasting queries, configured in accordance with one or more embodiments. The system illustrated in FIG. 5 includes a calling service 502 that communicates with a forecaster 504. The forecaster 504 includes aggregator nodes 506-512 and counter nodes 514-524. Several of the counter nodes are included within a counter node subcluster 526.

According to various embodiments, a node may be a server having a processor and memory. Alternately, different nodes may be implemented on different processors within a server.

According to various embodiments, stratified sampling may provide significantly improved accuracy over uniform sampling given the same sample size constraint. However, query accuracy is dependent on the sample size under both techniques. That is, using a larger sample will generally allow for more accurate query results. In order to handle a larger sample size, the sample may be distributed over a set of servers. Since the queries are easily parallelizable, overall system latency may be significantly reduced. Also, the results from many queries over a single sample may be calculated simultaneously.

According to various embodiments, the calling service 502 represents any system configured to transmit a query request to the forecaster. For instance, the calling service 502 may be a system configured to receive request information from advertisers and formulate queries based on the request information. The forecaster 504 includes a collection of counter nodes and aggregator nodes that together can receive a query request, execute the query request, and return a result.

The aggregator nodes 506-512 receive requests from calling services and coordinate query activity among the counter nodes. In some embodiments, each forecasting request is wrapped in a collector and added to a queue. When an aggregator begins processing a query request, the aggregator node selects a subcluster of counter nodes to execute the request. Then, the aggregator node distributes the query request among the selected subcluster.

According to various embodiments, the aggregator node receives partial results from the counter nodes and aggregates the partial responses into a final result. For instance, each counter node may count the number of sample observations within the portion of the sample present on the counter node that satisfy the query parameters. In particular embodiments, this distinction of responsibilities may allow the system to process an increasing amount of data while adding only a relatively small constant overhead of network communication and the increased time of partial report aggregation as new servers are introduced.

In some embodiments, each counter node traverses the portion of the stratified sample present on that node and executes a query for that sample portion. For instance, when a counter node receives a request, the counter node may add the request to a queue that is used to store and update awaiting forecasting requests. Then, the counter node may execute the query by applying the query parameters to the portion of the data sample present on the counter node.

According to various embodiments, each request at a counter node may be wrapped in a collector. The collector may orchestrate one or more threads processing data that is fed by consumer threads iterating over the data. This strategy of consuming and processing data may facilitate the processing of data points using compression and decompression techniques for memory optimization. Further, the system can scale with additional requests since optimizing the data does not cause the system to incur additional costs beyond the extra overhead of evaluating the data points for the new request.

In some embodiments, the data consuming and processing threads are symmetric, meaning that each consumer pushes data to a specific process thread, which makes thread synchronization and locking unnecessary. When a partial result needs to be pushed, the results of the processing threads can be merged together and transmitted to the aggregator via the network.

The counter may also acquire a processor thread to frequently push partial results to the aggregator that distributed the request. Pushing the data to the aggregator instead of allowing the aggregator to pull the data upon request may reduce the amount of communication between the servers within the system and can help in determining if a forecast prediction is already within a designated margin of error threshold. In this way, the system may support early query termination, which can help reduce the overall system load on counter nodes and enable higher query throughput.

In particular embodiments, pushing these partial results may allow the aggregator node to aggregate the partial results and provide an aggregated partial result in advance of the final result. Calculating an aggregated partial result may allow the system to provide faster feedback to users so that users can see the result of a query develop over time and need not wait until the entire query result calculation is complete. In addition, pushing a partial result instead of a difference between subsequent pushes may allow the system to be more fault tolerant since losing a single partial result network communication message does not adversely affect the system.

When an aggregator node receives partial responses from the counter nodes, the aggregator node may perform any necessary result scaling to determine the final result from the partial responses. For instance, the aggregator node may calculate a sum of the partial results received from different nodes and then multiply the final result by a scaling factor determined based on the proportion of the overall dataset represented by the queried sample.

According to various embodiments, the aggregator node may perform the merging and scaling of results received from counter nodes at any of various times, including upon receipt of a partial query result from a counter node, upon receive of final query results from all counter nodes, and/or at regularly scheduled intervals. For instance, the merging and scaling may be performed when a designated number of new partial results have been received from counter nodes.

According to various embodiments, a query requested at an aggregator node is considered to be finished when any of several conditions are met. For example, the query request is finished when the full set of the sample available to the aggregator node has been processed. As another example, the query request is finished when an acceptable prediction error threshold has been reached. As yet another example, the query request is finished when the result was not requested for a longer amount of time. The aggregator node may run a maintenance thread to check if any of the collectors are finished. Those that are finished may be removed from the queue. The results may be stored in cache memory or in a storage system.

Figure 6:
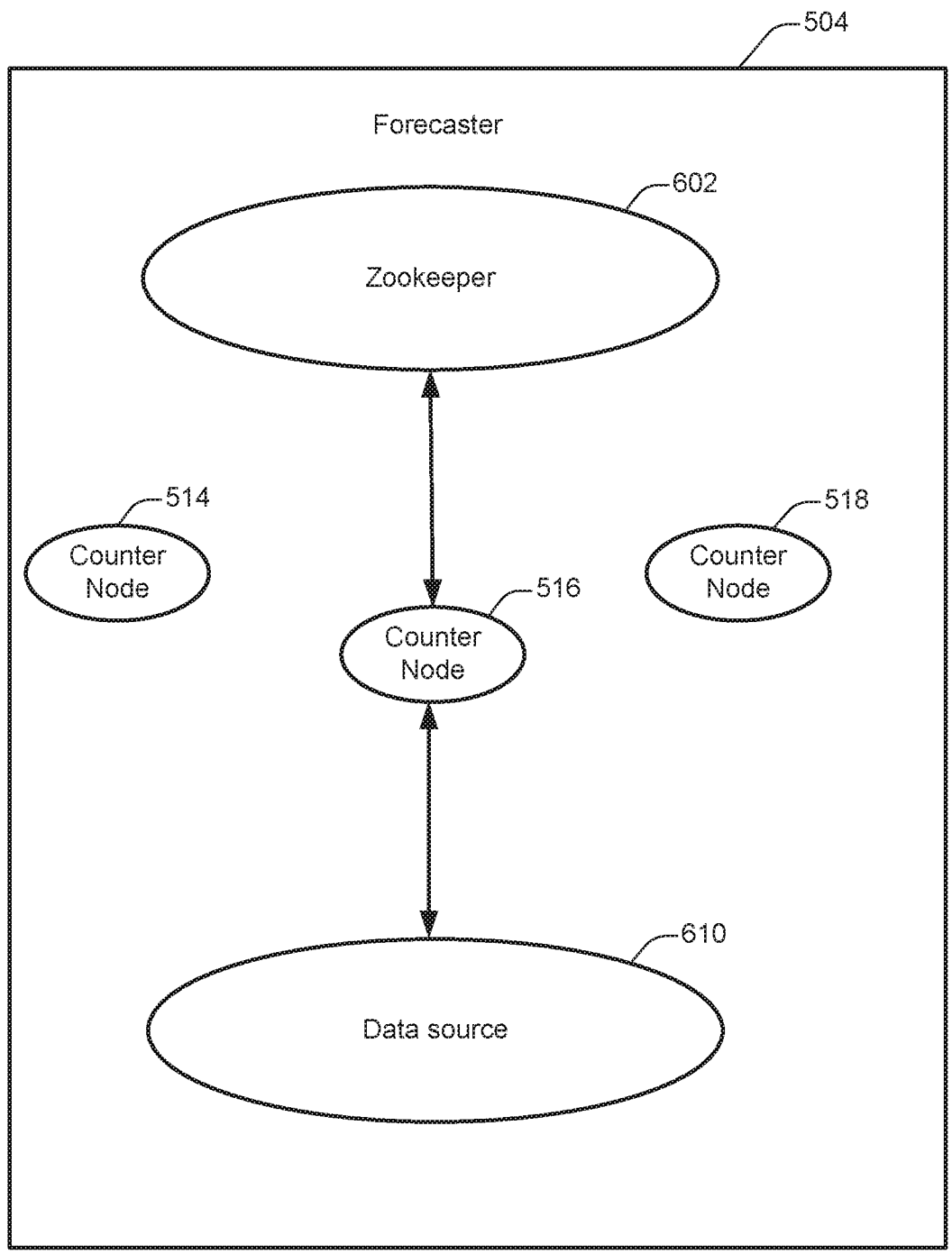
FIG. 6 illustrates an example of a system for executing forecasting queries, configured in accordance with one or more embodiments.

FIG. 6 illustrates an example of a system for executing forecasting queries, configured in accordance with one or more embodiments. The system shown in FIG. 6 includes the forecaster 504, the counter nodes 514-518, a zookeeper service 602, and a data source 610. When a new data sample portion has been selected for a counter node, the counter node may receive the new data sample portion from the data source 610. The zookeeper service 602 may coordinate this updating activity so that system availability is maintained even as counter nodes are being updated.

According to various embodiments, a stratified sample may be generated periodically. For instance, a dataset may be updated with new data, and a new sample may be selected to reflect the updated dataset. The stratified sampling may be selected offline, for instance via a Map-Reduce process. The selected sample may then be stored on a network-accessible file system 610 that can be accessed from the network nodes, such as the counter nodes within the forecaster 504. For instance, the sample may be stored on a Hadoop File System (HDFS).

The zookeeper 602 may supervise the distribution of the sample among the counter nodes and may notify each counter node when a new set of sample data is available for that counter node. According to various embodiments, the sample may be divided into per server sub-samples. The sub-samples may have similar strata but different observations so that different counter nodes store different portions of the sample.

In particular embodiments, by dividing the sample in this way, the computation at each counter node can be performed independently and can be scaled up properly. When a counter node fails, the sub-sample available at that counter node is temporarily lost from the whole system until a new counter node takes over, which can potentially reduce the accuracy the forecast in that time interval.

According to various embodiments, the per-server sample is loaded up in memory at each counter node to reduce the input-output (I/O) overhead in calculating query results. The zookeeper service 602 may be used to orchestrate loading the updated sample data and ensure that not all the counters are unavailable at the time of loading. Further, the zookeeper service 602 may be used to assign a different sub-sample to each counter node. Given an available set of counter machines, each machine may be instructed to load a different sub-sample since non-responding nodes are handled gracefully.

For instance, the zookeeper may receive a message that new sub-samples are available for the counter nodes. The zookeeper may then select one or more of the available counter nodes for updating, such as the counter node 516. The zookeeper may transmit a message to the selected counter node and/or the aggregator nodes that instructs the selected counter node to be placed offline for the purpose of query calculation. Then, each selected counter node will retrieve and load a new sub-sample from the data source 610.

According to various embodiments, newly acquired sub-samples may be loaded into counter node memory using multiple threads. The use of multiple threads may provide improved performance and/or may facilitate setting up multiple threads for consuming the data. Memory on counter nodes may be scarce in the sense that two per-server samples cannot be loaded into memory at the same time. Accordingly, the counter node may stop taking new requests from the aggregator and then wait for the existing requests to be finished. After the requests are finished, the counter node start reloading the new sub-sample in memory. This counter node may be ready for new requests after the reload has happened successfully. For instance, the counter node may transmit a message to the zookeeper node 602 indicating that the reload is complete.

The various nodes, systems, subsystems, and services shown in FIGS. 5 and 6 may communicate in various ways to facilitate rapid and accurate query calculation along with sample and sub-sample updating. For instance, nodes may share information regarding which portions of a sample are available on which nodes so that results can be scaled appropriately and so that suitable subclusters may be selected. Information sharing between the nodes may also facilitate tuning the system in terms of performance and accuracy. Also, in some instances a node may not have loaded the full available sample into memory, and other nodes may need to be informed of this deficiency.

In some embodiments, when a node is activated, it may send and receive information requests so that it is informed of the sample contents of other nodes and so that other nodes are informed of its sample contents. For example, such information may be transmitted in a broadcast fashion. An aggregator responsible for calculating a query result may store metadata describing current and past sample information for some or all of the counter nodes in order to correctly scale the partial results even when the sample data available on one or more of the counter nodes changes.

In some configurations, the overall load on the system may be modeled by the equation:

$$t_d + t_s + t_c + t_m = O\left(N + \frac{S}{N}\right)$$

In this equation, $t_d$ is the time to distribute the request among N counter nodes, $t_s$ is the time to scan the sample per node, $t_c$ is the communication latency overhead, $t_m$ is the time to merge the results on the aggregator node for a sample of size S. In particular embodiments, this equation may be used to fine-tune the system. Lowering the number of counter nodes querying a certain result can increase the performance but may slow down the progressive report. A similar tradeoff may be achieved by increasing the delay between the counter nodes reporting partial results. The sample size may be tuned as well, since $t_m$ may contribute significantly to the overall system load. A greater representative sample may increase accuracy especially for more granular filtering, while small sample may speed up the report generation as counter nodes finish faster. Adding additional counter nodes may increase $t_s$ only slightly since the nodes work in parallel and the communication overhead is significantly less that the cost of processing the sample. By adjusting parameters such as these, the system can be easily tuned to process a sample of a requested size quite quickly, for example within seconds of receiving a request.

According to various embodiments, the system may be configured to be fault tolerant in any or all of several different ways. For example, the zookeeper service may monitor the number of nodes that are active and alive and can distribute responsibilities among the nodes accordingly. A node failure can result in a temporary decrease in performance or accuracy until a new node is introduced. In the case of aggregator node failure, a failed forecasting report may be resubmitted to a different aggregator node.

As another example, estimates may be computed with a margin of error such that node failure can still yield a usable estimate.

According to various embodiments, the system may be scalable in any of several different ways. For example, servers may be added to forecast faster or with greater accuracy. For instance, new counter nodes may be introduced with only a small increase in overhead. This allows for an increase in sample size and/or a redistribution of the current sample to include the newly added node, which decreases the time needed to process the sample per server. As another example, an increased number of forecast queries may be handled by introducing new aggregators to handle the outside communication and/or by tuning the size of the sub-cluster used for forecasting. In some instances, a smaller sub-cluster of counter nodes may be selected so that the nodes are not exhausted while the accuracy of the forecast is not significantly reduced.

Figure 7:
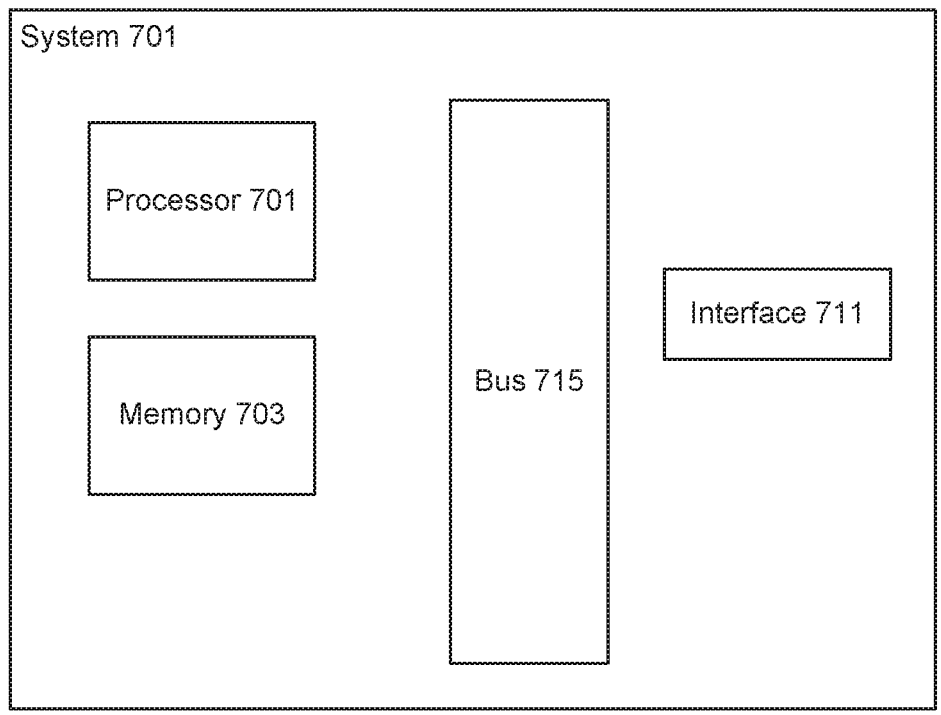
FIG. 7 illustrates an example of a server, configured in accordance with one or more embodiments.

FIG. 7 illustrates one example of a server. According to particular embodiments, a system 700 suitable for implementing particular embodiments of the present invention includes a processor 701, a memory 703, an interface 711, and a bus 715 (e.g., a PCI bus or other interconnection fabric) and operates as a counter node, aggregator node, calling service, zookeeper, or any other device or service described herein. Various specially configured devices can also be used in place of a processor 701 or in addition to processor 701. The interface 711 is typically configured to send and receive data packets over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. Although a particular server is described, it should be recognized that a variety of alternative configurations are possible.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    designating a subset of a plurality of features in a dataset for strata selection, wherein the dataset includes a plurality of feature vectors, each feature vector including a plurality of values that correspond with the plurality of features, wherein a size of the dataset corresponds to a quantity of feature vectors in the dataset;
    partitioning the feature vectors into a plurality of strata based on the designated subset of the plurality of features, each stratum corresponding to a possible combination of values for the designated subset of the plurality of features such that each feature vector is assigned to a respective stratum based on the values of the designated subset of the plurality of features for the feature vector, each stratum including a respective stratum size corresponding to a number of feature vectors included in the stratum;
    determining a stability threshold proportional to a ratio of the size of the dataset to a sample size;
    designating one or more of the strata as being unstable, an unstable stratum having a respective stratum size that is less than or equal to the stability threshold, wherein strata that are not designated as unstable are designated as stable strata;
    selecting a subset of feature vectors from the dataset as a sample with the sample size, wherein the subset of feature vectors in the sample are selected from respective stable strata in quantities that are proportional to the respective stratum sizes such that the respective stratum sizes of strata represented in the sample are approximately proportional to the respective stratum sizes of corresponding strata in the dataset;
    distributing the sample among a plurality of counter nodes via data packets over a network, each of the plurality of counter nodes storing a respective portion of the sample in memory;
    transmitting a query request from an aggregator node to each of the plurality of counter nodes via data packets over the network; and
    aggregating a plurality of responses to the query request at the aggregator node, the plurality of responses received from the plurality of counter nodes via data packets over the network, each response describing a result of the query request for the respective portion of the sample stored on the counter node.

2. The method of claim 1, wherein designating the subset of the plurality of features includes determining an actual or estimated minimum vertex cover of a feature dependency graph representing the dataset, each feature being capable of assuming two or more values, the feature dependency graph representing a plurality of conditional dependencies between the features.

3. The method recited in claim 1, wherein a stratum is designated as unstable when the respective stratum size is less than or equal to the size of the dataset divided by twice the sample size.

4. The method recited in claim 1, the method further comprising:
    determining a respective fallback position for each or selected ones of the strata designated as unstable, each fallback position grouping the feature vectors within the unstable stratum with feature vectors within a different stratum.

5. The method recited in claim 4, wherein determining a respective fallback position comprises merging the unstable stratum with a selected stable stratum, the selected stable stratum being selected from a set of one or more stable strata that include feature vectors that most closely match the unstable stratum.

6. The method recited in claim 5, wherein the selected stable stratum is associated with the smallest of the respective stratum sizes of the strata in the set of one or more stable strata.

7. The method recited in claim 6, wherein determining a respective fallback position comprises distributing the feature vectors associated with the unstable stratum among one or more intersecting strata that are associated with values that overlap those of the unstable stratum.

8. The method recited in claim 7, wherein the feature vectors associated with the unstable stratum are distributed among the one or more intersecting strata in proportion to a degree to which the unstable stratum intersects each intersecting stratum.

9. The method of claim 1, further comprising constructing a cumulative result based on the plurality of responses received from one or more of the plurality of counter nodes, wherein the cumulative result is updated in real-time as the responses are received.

10. The method of claim 9, wherein the cumulative result is constructed based on the plurality of responses received from one or more, but not all, of the plurality of counter nodes.

11. The method of claim 9,
    wherein a quantity of counter nodes in the plurality of counter nodes is increased to increase accuracy of the cumulative result;
    wherein the quantity of counter nodes in the plurality of counter nodes is decreased to increase a speed of receiving the plurality of responses.

12. A system comprising:
    a storage system operable to store a dataset including a plurality of feature vectors and a plurality of features, each feature vector including a plurality of values that correspond with the plurality of features, wherein a size of the dataset corresponds to a quantity of feature vectors in the dataset;
    a processor operable to:
        designate a subset of a plurality of features in the dataset for strata selection,
        partition the feature vectors into a plurality of strata based on the designated subset of the plurality of features, each stratum corresponding to a possible combination of values for the designated subset of the plurality of features such that each feature vector is assigned to a respective stratum based on the values of the designated subset of the plurality of features for the feature vector, each stratum including a respective stratum size corresponding to a number of feature vectors included in the stratum, determine a stability threshold proportional to a ratio of the size of the dataset to a sample size, designate one or more of the strata as being unstable, an unstable stratum having a respective stratum size that is less than or equal to the stability threshold, wherein strata that are not designated as unstable are designated as stable strata, and select a subset of feature vectors from the dataset as a sample with the sample size, wherein the subset of feature vectors in the sample are selected from respective stable strata in quantities that are proportional to the respective stratum sizes such that the respective stratum sizes of strata represented in the sample are approximately proportional to the respective stratum sizes of corresponding strata in the dataset; and a plurality of computing nodes including one or more counter nodes and one or more aggregator nodes, wherein the sample is distributed among the one or more counter nodes via data packets over a network, each counter node storing a respective portion of the sample in memory, and wherein the aggregator node is configured to transmit a query request to each counter node via data packets of the network, and aggregate a plurality of responses to the query requests, the plurality of responses received from the one or more counter nodes via data packets over the network, each response describing a result of the query request for the respective portion of the sample stored on the counter node.

13. The system of claim 12, wherein the processor designates the subset of the plurality of features by determining an actual or estimated minimum vertex cover of a feature dependency graph representing the dataset, each feature being capable of assuming two or more values, the feature dependency graph representing a plurality of conditional dependencies between the features.

14. The system recited in claim 12, wherein a stratum is designated as unstable when the respective stratum size is less than or equal to the size of the dataset divided by twice the sample size.

15. The system recited in claim 12, wherein the processor is further operable to determine a respective fallback position for each or selected ones of the strata designated as unstable, each fallback position grouping the feature vectors within the unstable stratum with feature vectors within a different stratum.

16. The system recited in claim 15,
wherein determining a respective fallback position comprises merging the unstable stratum with a selected stable stratum, the selected stable stratum being selected from a set of one or more stable strata that include feature vectors that most closely match the unstable stratum, and
wherein the selected stable stratum is associated with the smallest of the respective stratum sizes of the strata in the set of one or more stable strata.

17. The system recited in claim 15, wherein determining a respective fallback position comprises distributing the feature vectors associated with the unstable stratum among one or more intersecting strata that are associated with values that overlap those of the unstable stratum, and wherein the feature vectors associated with the unstable stratum are distributed among the one or more intersecting strata in proportion to a degree to which the unstable stratum intersects each intersecting stratum.

18. A non-transitory computer readable media storing one or more programs configured for execution by a computer system, the one or more programs comprising instructions for:
designating a subset of a plurality of features in a dataset for strata selection, wherein the dataset includes a plurality of feature vectors, each feature vector including a plurality of values that correspond with the plurality of features, wherein a size of the dataset corresponds to a quantity of feature vectors in the dataset;
partitioning the feature vectors into a plurality of strata based on the designated subset of the plurality of features, each stratum corresponding to a possible combination of values for the designated subset of the plurality of features such that each feature vector is assigned to a respective stratum based on the values of the designated subset of the plurality of features for the feature vector, each stratum including a respective stratum size corresponding to a number of feature vectors included in the stratum;
determining a stability threshold proportional to a ratio of the size of the dataset to a sample size;
designating one or more of the strata as being unstable, an unstable stratum having a respective stratum size that is less than or equal to the stability threshold, wherein strata that are not designated as unstable are designated as stable strata;
selecting a subset of feature vectors from the dataset as a sample with the sample size, wherein the subset of feature vectors in the sample are selected from respective stable strata in quantities that are proportional to the respective stratum sizes such that the respective stratum sizes of strata represented in the sample are approximately proportional to the respective stratum sizes of corresponding strata in the dataset;
distributing the sample among a plurality of counter nodes via data packets over a network, each of the plurality of counter nodes storing a respective portion of the sample in memory;
transmitting a query request from an aggregator node to each of the plurality of counter nodes via data packets over the network; and
aggregating a plurality of responses to the query request at the aggregator node, the plurality of responses received from the plurality of counter nodes via data packets over the network, each response describing a result of the query request for the respective portion of the sample stored on the counter node.

19. The non-transitory computer readable media recited in claim 18, wherein designating the subset of the plurality of features includes determining an actual or estimated minimum vertex cover of a feature dependency graph representing the dataset, each feature being capable of assuming two or more values, the feature dependency graph representing a plurality of conditional dependencies between the features.

20. The non-transitory computer readable media recited in claim 18, wherein the one or more programs further comprise instructions for determining a respective fallback position for each or selected ones of the strata designated as unstable, each fallback position grouping the feature vectors within the unstable stratum with feature vectors within a different stratum.

* * * * *